(12) United States Patent
Yoshimura

(10) Patent No.: US 11,745,445 B2
(45) Date of Patent: Sep. 5, 2023

(54) METHOD OF DESIGNING ANISOTROPIC COMPOSITE LAMINATE STRUCTURE

(71) Applicant: SUBARU CORPORATION, Tokyo (JP)

(72) Inventor: Kensuke Yoshimura, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/695,669

(22) Filed: Mar. 15, 2022

(65) Prior Publication Data

US 2022/0305744 A1    Sep. 29, 2022

(30) Foreign Application Priority Data

Mar. 26, 2021  (JP) .................................. 2021-053288

(51) Int. Cl.
| | | |
|---|---|---|
| *B32B 41/00* | (2006.01) | |
| *B29C 70/54* | (2006.01) | |
| *B32B 5/12* | (2006.01) | |
| *B29C 70/30* | (2006.01) | |
| *B29L 31/30* | (2006.01) | |

(52) U.S. Cl.
CPC ............. *B29C 70/54* (2013.01); *B29C 70/30* (2013.01); *B32B 5/12* (2013.01); *B29L 2031/3076* (2013.01); *B32B 2605/18* (2013.01)

(58) Field of Classification Search
CPC ........... B29C 70/54; B29C 70/30; B32B 5/12; B32B 2605/18; B32B 2250/20; B32B 2260/023; B32B 2262/0269; B32B 2262/10; B32B 5/26; B32B 5/02; B32B 2260/046; B32B 2262/101; B32B 2262/106; B32B 2307/54; B29L 2031/3076; G06F 30/00
USPC .................. 156/60, 64, 350, 351, 378, 379
See application file for complete search history.

(56) References Cited

U.S. PATENT DOCUMENTS

| | | | |
|---|---|---|---|
| 2014/0209744 A1 | 7/2014 | Marcoe | |
| 2017/0057195 A1* | 3/2017 | Blom | ........................ B64C 3/26 |
| 2022/0152947 A1* | 5/2022 | Smith | .................. B29C 70/304 |

FOREIGN PATENT DOCUMENTS

JP          2014-144770 A      8/2014

* cited by examiner

*Primary Examiner* — Michael N Orlando
*Assistant Examiner* — Joshel Rivera
(74) *Attorney, Agent, or Firm* — Smith, Gambrell & Russell, LLP

(57) ABSTRACT

A method of designing an anisotropic composite laminate structure to constitute a predetermined member of an airframe structure of an aircraft and includes a plurality of types of composite layers containing reinforcing fibers with different fiber orientations is provided. The method includes dividing the anisotropic composite laminate structure in the predetermined member into a plurality of regions in a thickness direction. The method includes determining, for each of the regions, at least a stacking sequence of the plurality of types of composite layers in accordance with a direction of stress acting on the predetermined member.

21 Claims, 6 Drawing Sheets

| PLY NUMBER | ORIENTATION | | PLY NUMBER | ORIENTATION |
|---|---|---|---|---|
| 1 | +90° | | 21 | +90° |
| 2 | +45° | | 22 | −45° |
| 3 | +45° | | 23 | +0° |
| 4 | +45° | | 24 | +0° |
| 5 | +0° | REGION 4 | 25 | +45° | REGION 2
| 6 | −45° | | 26 | +90° |
| 7 | +90° | | 27 | +90° |
| 8 | +45° | | 28 | −45° |
| 9 | +45° | | 29 | +0° |
| 10 | +45° | | 30 | −45° |
| 11 | +0° | | 31 | +90° |
| 12 | +45° | | 32 | +45° |
| 13 | +0° | | 33 | +0° |
| 14 | −45° | | 34 | +0° |
| 15 | −45° | REGION 3 | 35 | +0° | REGION 1
| 16 | +90° | | 36 | −45° |
| 17 | −45° | | 37 | +90° |
| 18 | −45° | | 38 | +90° |
| 19 | +90° | | 39 | −45° |
| 20 | +45° | | 40 | +0° |

| PLY NUMBER | ORIENTATION |
|---|---|
| 1 | +45° |
| 2 | +0° |
| 3 | +0° |
| 4 | +0° |
| 5 | −45° |
| 6 | +90° |
| 7 | +45° |
| 8 | +0° |
| 9 | +0° |
| 10 | +0° |
| 11 | −45° |
| 12 | −45° |
| 13 | +0° |
| 14 | +45° |
| 15 | +45° |
| 16 | +90° |
| 17 | −45° |
| 18 | −45° |
| 19 | +0° |
| 20 | +45° |

Plies 1–10: REGION 4
Plies 11–20: REGION 3

| PLY NUMBER | ORIENTATION |
|---|---|
| 21 | +45° |
| 22 | +90° |
| 23 | −45° |
| 24 | −45° |
| 25 | +0° |
| 26 | +45° |
| 27 | +45° |
| 28 | +90° |
| 29 | −45° |
| 30 | +90° |
| 31 | +90° |
| 32 | +45° |
| 33 | +0° |
| 34 | −45° |
| 35 | +90° |
| 36 | +90° |
| 37 | +45° |
| 38 | +90° |
| 39 | −45° |
| 40 | +90° |

Plies 21–30: REGION 2
Plies 31–40: REGION 1

| PLY NUMBER | ORIENTATION |
|---|---|
| 1 | −45° |
| 2 | −45° |
| 3 | −45° |
| 4 | +0° |
| 5 | +45° |
| 6 | +90° |
| 7 | +45° |
| 8 | +0° |
| 9 | −45° |
| 10 | −45° |
| 11 | −45° |

Plies 1–3: REGION 3
Plies 4–8: REGION 2
Plies 9–11: REGION 1

METHOD OF DESIGNING ANISOTROPIC COMPOSITE LAMINATE STRUCTURE

CROSS-REFERENCE TO RELATED APPLICATIONS

The present application claims priority from Japanese Patent Application No. 2021-053288 filed on Mar. 26, 2021, the entire contents of which are hereby incorporated by reference.

BACKGROUND

The disclosure relates to a method of designing an anisotropic composite laminate structure.

In recent years, airframe structures of aircrafts have used composites, such as carbon fiber composites (e.g., carbon fiber reinforced plastics (CFRPs)), to achieve light weight. For example, Japanese Unexamined Patent Application Publication No. 2014-144770 discloses an example in which beams of wings of aircrafts have an anisotropic composite laminate structure. The anisotropic composite laminate structure includes a plurality of types of composite layers containing reinforcing fibers with different orientations.

SUMMARY

An aspect of the disclosure provides a method of designing an anisotropic composite laminate structure to constitute a predetermined member of an airframe structure of an aircraft and includes a plurality of types of composite layers containing reinforcing fibers with different fiber orientations. The method includes dividing the anisotropic composite laminate structure in the predetermined member into a plurality of regions in a thickness direction. The method includes determining, for each of the regions, at least a stacking sequence of the plurality of types of composite layers in accordance with a direction of stress acting on the predetermined member.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

To further reduce the weight of the airframe structure of the aircraft, a fiber orientation proportion and a stacking sequence in the anisotropic composite laminate structure are to be optimized. The optimization of the fiber orientation proportion and the stacking sequence leaves room for improvement, and the properties of the anisotropic material are yet to be fully utilized.

It is desirable to provide a designing method that optimizes the stacking sequence in the anisotropic composite laminate structure while making use of the properties of the anisotropic material.

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

[1. Overall Structure of Aircraft]

Figure 1:
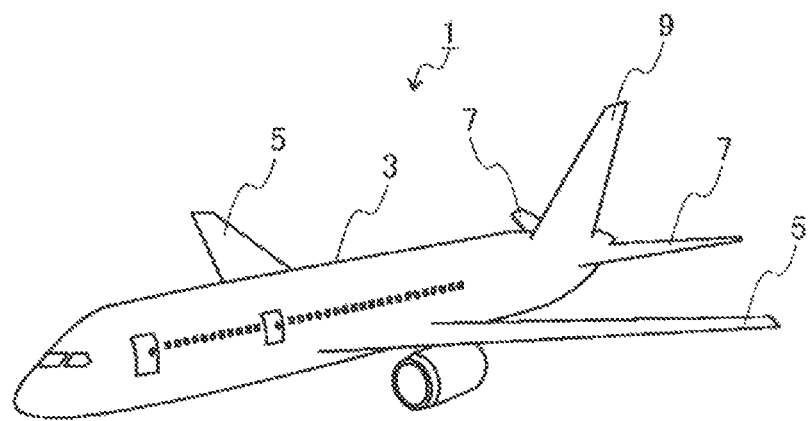
FIG. 1 is a schematic perspective view of an aircraft according to an embodiment of the disclosure.

An overall structure of an aircraft 1 according to an embodiment of the disclosure will now be described with reference to FIG. 1. FIG. 1 is a schematic perspective view of the aircraft 1 according to the embodiment of the disclosure.

As illustrated in FIG. 1, the aircraft 1 includes a fuselage 3, a pair of main wings 5, a pair of horizontal stabilizers 7, and a vertical stabilizer 9. Hereinafter, the main wings 5, the horizontal stabilizers 7, and the vertical stabilizer 9 may each be simply referred to as a wing.

The fuselage 3 is a central structural member of the airframe of the aircraft 1. The fuselage 3 is longer in the front-back direction (roll axis direction) than in the right-left direction (pitch axis direction) and the up-down direction (yaw axis direction). The fuselage 3 internally forms a cabin space for accommodating passengers. Also, the fuselage 3 contains a drive source, such as an engine, a fuel tank, driving devices, measurement instruments, and various other devices.

The fuselage 3 has the pair of main wings 5 on both the right and left sides of the center thereof. The main wings 5 are disposed to extend outward from the center of the fuselage 3 on both the right and left sides. The main wings 5 provide upward lift to the aircraft 1.

The fuselage 3 has the pair of horizontal stabilizers 7 on both the right and left sides of the rear thereof. The horizontal stabilizers 7 are disposed to extend outward from the rear of the fuselage 3 on both the right and left sides. The horizontal stabilizers 7 have the function of maintaining stability about the pitch axis of the aircraft 1.

The fuselage 3 has the vertical stabilizer 9 on the upper side of the rear thereof. The vertical stabilizer 9 is disposed to extend upward from the rear of the fuselage 3. The vertical stabilizer 9 has the function of maintaining stability about the yaw axis of the aircraft 1.

An anisotropic composite laminate structure that constitutes a predetermined member of the airframe structure of the aircraft 1 according to the present embodiment may be used, for example, in a structural member of the main wings 5. Accordingly, an example of the structural member of the main wings 5 will be described in detail below. As in the case of the main wings 5, the anisotropic composite laminate structure of the aircraft 1 according to the embodiment of the disclosure may be used in other parts of the aircraft 1, such as the fuselage 3, the horizontal stabilizers 7, and the vertical stabilizer 9.

[2. Configuration of Main Wing]

Figure 2:
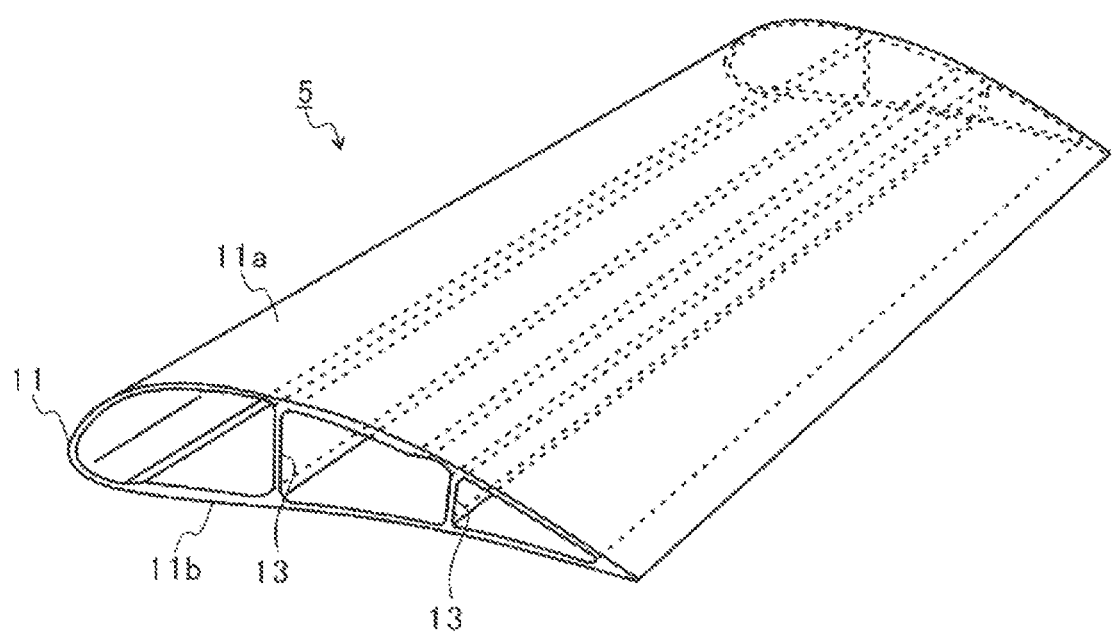
FIG. 2 is a schematic perspective view illustrating part of a structural member of a main wing according to the embodiment.

FIG. 2 is a schematic perspective view illustrating part of a structural member of the main wing 5 as an example of the anisotropic composite laminate structure of the aircraft 1 according to the present embodiment. As illustrated in FIG. 2, the main wing 5 includes a skin (outer plate) 11 and a plurality of beams 13.

The skin 11 has an airfoil shape. The skin 11 forms an outer covering of the main wing 5. The outer surface of the skin 11 is exposed to the space outside the main wing 5, whereas the inner surface of the skin 11 defines the space inside the main wing 5. The skin 11 includes an upper skin portion 11a forming the upper side of the main wing 5, and a lower skin portion 11b forming the lower side of the main wing 5.

The plurality of beams 13 are disposed between the upper skin portion 11a and the lower skin portion 11b in such a manner as to extend in the longitudinal direction of the main wing 5 (pitch axis direction). The plurality of beams 13 are spaced apart in the front-back direction of the main wing 5 (roll axis direction). The beams 13 are coupled at one end thereof to the upper skin portion 11a, and coupled at the other end thereof to the lower skin portion 11b.

The skin 11 and the beams 13 of the main wing 5 are made from composites containing reinforcing fibers and resin, such as carbon fiber reinforced plastics (CFRPs). Examples of the resin serving as a matrix include thermosetting resins, such as epoxy resin, polyamide resin, phenolic resin, benzoxazine resin, bismaleimide resin, and unsaturated polyester. The fiber reinforced composites according to the embodiment of the disclosure are not limited to CFRPs, and various other fiber reinforced plastics (FRPs) may be used. Examples of the fiber reinforced plastics include glass fiber reinforced plastic (glass FRP or GFRP) using glass fibers as a reinforcing material, boron fiber reinforced plastic (boron FRP or BFRP), resin fiber reinforced composites (e.g., aramid FRP or AFRP, Kevlar FRP or KFRP, Dyneema FRP or DFRP, and Zylon FRP or ZFRP) using resin fibers such as aramid, Kevlar, Dyneema, and Zylon fibers as reinforcing materials, and a silicon carbide fiber reinforced composite (silicon carbide FRP or SiCFRP) produced by fiberizing a compound of carbon and silicon. With the composites described above, it is possible to achieve a higher specific strength and a lighter weight than when the skin 11 and the beams 13 are made from metal materials.

The skin 11 and the beams 13 of the main wing 5 are laminate structures each including a plurality of types of composite layers stacked in the thickness direction. The reinforcing fibers contained in each composite layer are arranged to extend in a single direction (same direction). The plurality of types of composite layers are composite layers that include reinforcing fibers with different orientations. Accordingly, the skin 11 and the beams 13 of the main wing 5 each are an anisotropic composite laminate structure formed by stacking a plurality of types of anisotropic composite layers that contain reinforcing fibers with different orientations. In the present embodiment, the reinforcing fibers have four different orientations 0°, +45°, −45°, and 90°, with the longitudinal direction of the main wing 5 being 0°. However, the orientations of the reinforcing fibers are not limited to this, and may not be 0°, +45°, −45°, and 90°. The number of fiber orientations may be any value greater than one, and may be greater than or less than four.

The anisotropic composite laminate structure of the aircraft 1 according to the present embodiment constitutes the skin 11 and the beams 13 each serving as a predetermined member of the airframe structure of the aircraft 1. The predetermined member is not limited to this. The anisotropic composite laminate structure according to the present embodiment may constitute another predetermined member, such as a rib or a stringer.

To meet recent demand for improved fuel efficiency, a lighter weight airframe structure of the aircraft 1 is to be developed. As a solution to this, a fiber orientation proportion and a stacking sequence in the anisotropic composite laminate structure constituting a predetermined member of the airframe structure are to be optimized. The optimization of the fiber orientation proportion and the stacking sequence leaves room for improvement, and the properties of the anisotropic material are yet to be fully utilized.

In the anisotropic composite laminate structure of the aircraft 1 according to the present embodiment, at least the stacking sequence of the plurality of types of composite layers is determined in accordance with the direction of stress acting on each member of the airframe structure. In the present embodiment, a fiber orientation proportion, as well as the stacking sequence of the plurality of types of composite layers, is determined in accordance with the direction of stress acting on each member of the airframe structure. Thus, by making use of the properties of the anisotropic material, the fiber orientation proportion and the stacking sequence in the anisotropic composite laminate structure are optimized. It is thus possible to reduce the number of composite layers and achieve light weight. The anisotropic composite laminate structure of the aircraft 1 according to the present embodiment and a method of designing the anisotropic composite laminate structure will now be described in detail.

[3. Anisotropic Composite Laminate Structure of Lower Skin Portion]

Figures 3, 4:
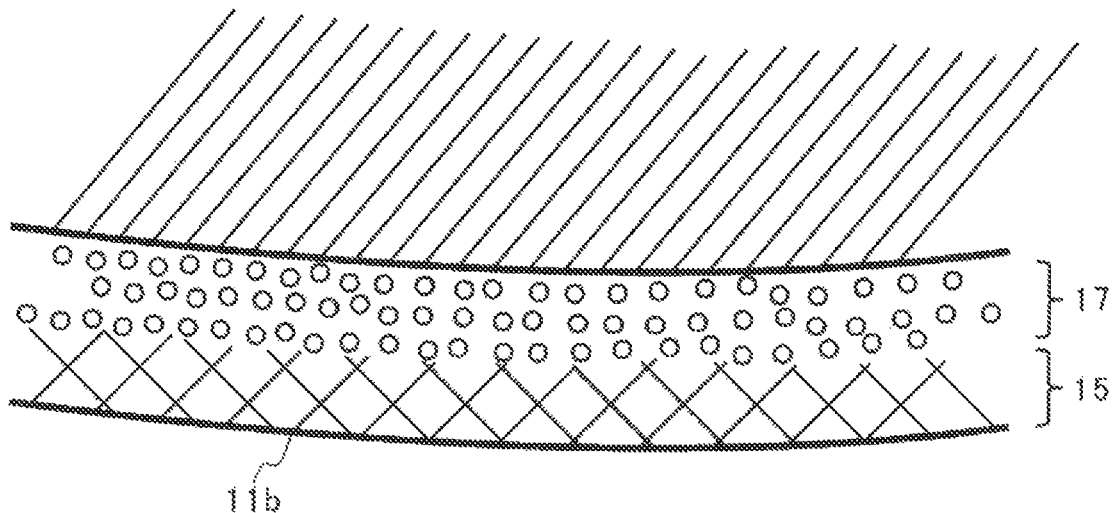
FIG. 3 is a schematic cross-sectional view illustrating an anisotropic composite laminate structure of a lower skin portion according to the embodiment.
FIG. 4 is a diagram illustrating a detailed laminate configuration of the lower skin portion according to the embodiment.

FIG. 3 is a schematic cross-sectional view illustrating an anisotropic composite laminate structure of the lower skin portion 11b according to the present embodiment. As illustrated in FIG. 3, the lower skin portion 11b includes a skin outer region 15 and a skin inner region 17. The skin outer region 15 is on the outer side of the lower skin portion 11b, and the skin inner region 17 is on the inner side of the lower skin portion 11b.

The lower skin portion 11b of the present embodiment include four types of composite layers containing reinforcing fibers oriented in the 0° direction, ±45° directions, and 90° direction. For example, the 0° direction is the longitudinal direction of the main wing 5, the +45° direction is a direction inclined 45° toward one side of the 0° direction in the in-plane direction of the lower skin portion 11b, the −45° direction is a direction inclined 45° toward the other side of the 0° direction in the in-plane direction of the lower skin portion 11b, and the 90° direction is a direction orthogonal to the 0° direction in the in-plane direction of the lower skin portion 11b. Hereinafter, a composite layer where the orientation of the reinforcing fibers is the 0° direction will be referred to as a 0° layer, a composite layer where the orientation of the reinforcing fibers is the +45° direction will be referred to as a +45° layer, a composite layer where the orientation of the reinforcing fibers is the −45° direction will be referred to as a −45° layer, and a composite layer where the orientation of the reinforcing fibers is the 90° direction will be referred to as a 90° layer. The +45° layer and the −45° layer may be collectively referred to as ±45° layers.

The skin outer region 15 includes more ±45° layers than 0° layers and 90° layers. The skin inner region 17 includes more 0° layers than +45° layers, −45° layers, and 90° layers.

FIG. 4 is a diagram illustrating a detailed laminate configuration of the lower skin portion 11b according to the present embodiment. As illustrated in FIG. 4, the lower skin portion 11b of the present embodiment includes a total of 40 composite layers stacked in the thickness direction. Although all the composite layers are of equal thickness in the present embodiment, the configuration is not limited to this, and the composite layers may have different thicknesses. In FIG. 4, numbers ("ply number" in FIG. 4) are sequentially assigned to composite layers listed in order from the outermost side to the innermost side of the lower skin portion 11b. The smaller the ply number, the closer the layer is to the outermost side of the lower skin portion 11b, and the larger the ply number, the closer the layer is to the innermost side of the lower skin portion 11b.

The lower skin portion 11b is divided into a plurality of regions (region 1, region 2, region 3, and region 4 here) in the thickness direction (stacking direction). Region 1 is a region including composite layers with ply numbers 31 to 40 and located inside regions 2, 3, and 4. Region 2 is a region including composite layers with ply numbers 21 to 30 and located outside region 1 and inside regions 3 and 4. Region 3 is a region including composite layers with ply numbers 11 to 20 and located outside regions 1 and 2 and inside region 4. Region 4 is a region including composite layers with ply numbers 1 to 10 and located outside regions 1, 2, and 3. Region 1 and region 2 correspond to the skin inner region 17 illustrated in FIG. 3, and region 3 and region 4 correspond to the skin outer region 15 illustrated in FIG. 3.

The composite layers in each region are stacked on the basis of stacking conditions 1 to 4 described below. Stacking condition 1 is that regions 1 to 4 each include at least one composite layer of each of the plurality of types (0° layer, +45° layer, −45° layer, and 90° layer here). This is because if composite layers of equal fiber orientation form a disproportionately large part, application of load to the anisotropic composite laminate structure may cause separation between the composite layers of equal fiber orientation and the other composite layers. If stacking condition 1 is satisfied, it is less likely that composite layers of equal fiber orientation will form a disproportionately large part. This means that even when load is applied, it is possible to prevent separation between composite layers and damage to the anisotropic composite laminate structure.

Stacking condition 2 is that the number of composite layers that are of equal fiber orientation and successive in the thickness direction does not exceed a predetermined value (three here). If stacking condition 2 is satisfied, it is less likely that composite layers of equal fiber orientation will form a disproportionately large part. This means that even when load is applied, it is possible to prevent separation between composite layers and damage to the anisotropic composite laminate structure.

Stacking condition 3 is that an angular difference between fiber orientations in two composite layers adjacent in the thickness direction does not exceed 45°. This is because if an angular difference between fiber orientations in two adjacent composite layers exceeds 45°, application of load to the anisotropic composite laminate structure may cause separation between the two composite layers. If stacking condition 3 is satisfied, it is less likely that application of load will cause separation between the two composite layers and damage the anisotropic composite laminate structure.

Stacking condition 4 is that the anisotropic composite laminate structure includes composite layers of different fiber orientations in equal proportion. Here, the proportion refers to the proportion of the total thickness of composite layers of each of the different fiber orientations, 0° layers, +45° layers, −45° layers, and 90° layers. In the present embodiment, where all the composite layers are of equal thickness, the proportion described above may be the proportion of the number of composite layers of each of the different fiber orientations, 0° layers, +45° layers, −45° layers, and 90° layers. If stacking condition 4 is satisfied, the time involved in performing optimization simulation for the anisotropic composite laminate structure can be reduced.

As illustrated in FIG. 4, region 1 includes four 0° layers, one +45° layer, two −45° layers, and three 90° layers. Accordingly, region 1, which includes at least one 0° layer, at least one +45° layer, at least one −45° layer, and at least one 90° layer, satisfies stacking condition 1. Also, region 1, which includes three 0° layers with ply numbers 33 to 35 successive in the thickness direction, satisfies stacking condition 2. Also, region 1, where an angular difference between fiber orientations in two composite layers adjacent in the thickness direction does not exceed 45°, satisfies stacking condition 3.

Region 2 includes three 0° layers, one +45° layer, three −45° layers, and three 90° layers. Accordingly, region 2, which includes at least one 0° layer, at least one +45° layer, at least one −45° layer, and at least one 90° layer, satisfies stacking condition 1. Also, region 2, which includes two 0° layers with ply numbers 23 and 24 successive in the thickness direction and two 90° layers with ply numbers 26 and 27 successive in the thickness direction, satisfies stacking condition 2. Also, region 2, where an angular difference between fiber orientations in two composite layers adjacent in the thickness direction does not exceed 45°, satisfies stacking condition 3.

Region 3 includes two 0° layers, two +45° layers, four −45° layers, and two 90° layers. Accordingly, region 3, which includes at least one 0° layer, at least one +45° layer, at least one −45° layer, and at least one 90° layer, satisfies stacking condition 1. Also, region 3, which includes two −45° layers with ply numbers 14 and 15 successive in the thickness direction and two −45° layers with ply numbers 17 and 18 successive in the thickness direction, satisfies stacking condition 2. Also, region 3, where an angular difference between fiber orientations in two composite layers adjacent in the thickness direction does not exceed 45°, satisfies stacking condition 3.

Region 4 includes one 0° layer, six +45° layers, one −45° layer, and two 90° layers. Accordingly, region 4, which includes at least one 0° layer, at least one +45° layer, at least one −45° layer, and at least one 90° layer, satisfies stacking condition 1. Also, region 4, which includes three +45° layers with ply numbers 2 to 4 successive in the thickness direction and three +45° layers with ply numbers 8 to 10 successive in the thickness direction, satisfies stacking condition 2. Also, region 4, where an angular difference between fiber orientations in two composite layers adjacent in the thickness direction does not exceed 45°, satisfies stacking condition 3.

Regions 1 to 4 include ten 0° layers, ten +45° layers, ten −45° layers, and ten 90° layers in total. Since all the composite layers are of equal thickness, the anisotropic composite laminate structure includes composite layers of different fiber orientations in equal proportion. Accordingly, the anisotropic composite laminate structure of the lower skin portion 11b according to the present embodiment satisfies stacking condition 4.

Note that satisfying stacking conditions 1 to 4 is optional. For example, at least one of stacking conditions 1 to 4 may be satisfied. Not all stacking conditions 1 to 4 are to be satisfied.

During flight of the aircraft 1, a vertical upward lift acts on the main wing 5. When the aircraft 1 flies at a predetermined speed or higher, a phenomenon called flutter may occur which amplifies vibration of the main wing 5. The flutter causes a load to act on the main wing 5 in the direction of twisting the main wing 5 with respect to the fuselage 3.

A load applied to the lower skin portion 11b produces stress and distortion inside the lower skin portion 11b. A lift acting on the main wing 5 causes a tensile stress to act on the lower skin portion 11b in the longitudinal direction of the main wing 5. Flutter causes a torsional stress to act on the lower skin portion 11b in the direction of twisting the main wing 5.

Therefore, in the skin outer region 15 of the lower skin portion 11b according to the present embodiment, the number of ±45° layers having stiffness against torsional stress is greater than those of the other composite layers (0° layers and 90° layers). When the skin outer region 15 includes more ±45° layers having stiffness against torsional stress, the level of stiffness against torsional stress is higher than when the skin inner region 17 includes more ±45° layers than other layers. That is, since the stiffness against torsional stress can be improved with fewer ±45° layers than when the skin inner region 17 includes more ±45° layers than other layers, it is possible to achieve light weight.

In the skin inner region 17 of the lower skin portion 11b, the number of 0° layers having stiffness against tensile stress is greater than those of the other composite layers (+45° layers, −45° layers, and 90° layers). This makes it possible to maintain stiffness against tensile stress while improving stiffness against torsional stress.

Figures 5, 6:
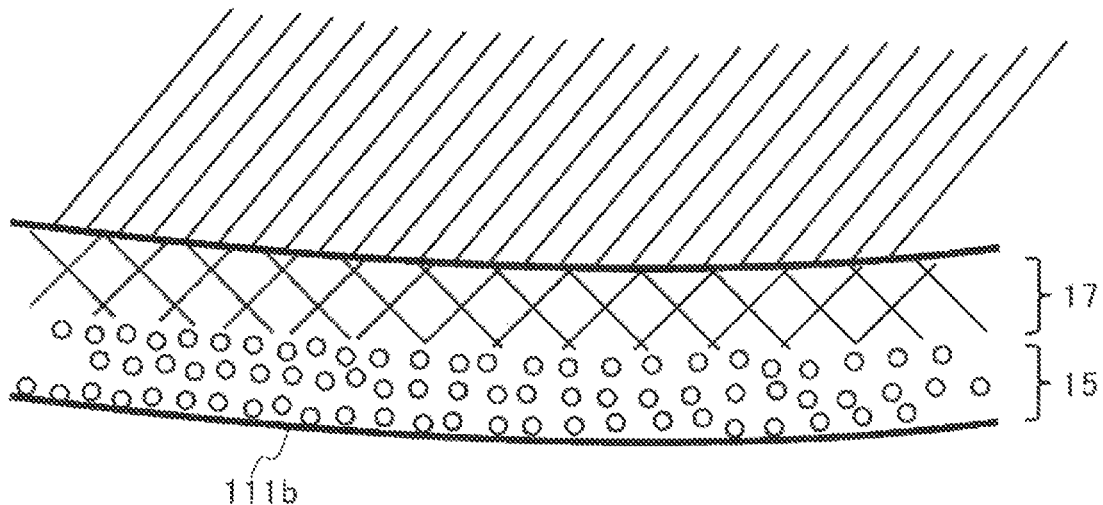
FIG. 5 is a schematic cross-sectional view illustrating an anisotropic composite laminate structure of a lower skin portion according to a modification.
FIG. 6 is a diagram illustrating a detailed laminate configuration of the lower skin portion according to the modification.

FIG. 5 is a schematic cross-sectional view illustrating an anisotropic composite laminate structure of a lower skin portion 111b according to a modification. As illustrated in FIG. 5, the skin outer region 15 of the lower skin portion 111b includes more 0° layers than +45° layers, −45° layers, and 90° layers. The skin inner region 17 of the lower skin portion 111b includes more ±45° layers than 0° layers and 90° layers.

FIG. 6 is a diagram illustrating a detailed laminate configuration of the lower skin portion 111b according to the modification. As illustrated in FIG. 6, the lower skin portion 111b of the present modification includes a total of 40 composite layers stacked in the thickness direction, as in the case of the embodiment described above. All the composite layers are of equal thickness in the present modification.

The lower skin portion 111b according to the present modification is also divided into a plurality of regions (region 1, region 2, region 3, and region 4 here) in the thickness direction (stacking direction). Region 1 is a region including composite layers with ply numbers 31 to 40, region 2 is a region including composite layers with ply numbers 21 to 30, region 3 is a region including composite layers with ply numbers 11 to 20, and region 4 is a region including composite layers with ply numbers 1 to 10. Region 1 and region 2 correspond to the skin inner region 17 illustrated in FIG. 5, and region 3 and region 4 correspond to the skin outer region 15 illustrated in FIG. 5. The composite layers in each region are stacked on the basis of stacking conditions 1 to 4 described above.

As illustrated in FIG. 6, region 1 includes one 0° layer, two +45° layers, two −45° layers, and five 90° layers. Accordingly, region 1, which includes at least one 0° layer, at least one +45° layer, at least one −45° layer, and at least one 90° layer, satisfies stacking condition 1. Also, region 1, which includes two 90° layers with ply numbers 35 and 36 successive in the thickness direction, satisfies stacking condition 2. Also, region 1, where an angular difference between fiber orientations in two composite layers adjacent in the thickness direction does not exceed 45°, satisfies stacking condition 3.

Region 2 includes one 0° layer, three +45° layers, three −45° layers, and three 90° layers. Accordingly, region 2, which includes at least one 0° layer, at least one +45° layer, at least one −45° layer, and at least one 90° layer, satisfies stacking condition 1. Also, region 2, which includes two +45° layers with ply numbers 26 and 27 successive in the thickness direction and two −45° layers with ply numbers 23 and 24 successive in the thickness direction, satisfies stacking condition 2. Also, region 2, where an angular difference between fiber orientations in two composite layers adjacent in the thickness direction does not exceed 45°, satisfies stacking condition 3.

Region 3 includes two 0° layers, three +45° layers, four −45° layers, and one 90° layer. Accordingly, region 3, which includes at least one 0° layer, at least one +45° layer, at least one −45° layer, and at least one 90° layer, satisfies stacking condition 1. Also, region 3, which includes two −45° layers with ply numbers 11 and 12 successive in the thickness direction and two −45° layers with ply numbers 17 and 18 successive in the thickness direction, satisfies stacking condition 2. Also, region 3, which includes two +45° layers with ply numbers 14 and 15 successive in the thickness direction, satisfies stacking condition 2. Also, region 3, where an angular difference between fiber orientations in two composite layers adjacent in the thickness direction does not exceed 45°, satisfies stacking condition 3.

Region 4 includes six 0° layers, two +45° layers, one −45° layer, and one 90° layer. Accordingly, region 4, which includes at least one 0° layer, at least one +45° layer, at least one −45° layer, and at least one 90° layer, satisfies stacking condition 1. Also, region 4, which includes three 0° layers with ply numbers 2 to 4 successive in the thickness direction and three 0° layers with ply numbers 8 to 10 successive in the thickness direction, satisfies stacking condition 2. Also, region 4, where an angular difference between fiber orientations in two composite layers adjacent in the thickness direction does not exceed 45°, satisfies stacking condition 3.

Regions 1 to 4 include ten 0° layers, ten +45° layers, ten −45° layers, and ten 90° layers in total. Since all the composite layers are of equal thickness, the anisotropic composite laminate structure includes composite layers of different fiber orientations in equal proportion.

Accordingly, the anisotropic composite laminate structure of the lower skin portion 111b according to the present modification satisfies stacking condition 4.

In the skin outer region 15 of the lower skin portion 111b according to the present modification, the number of 0° layers having stiffness against tensile stress is greater than those of the other composite layers (+45° layers, −45° layers, and 90° layers). When the skin outer region 15 includes more 0° layers having stiffness against tensile stress, the level of stiffness against tensile stress is higher than when the skin inner region 17 includes more 0° layers than other layers. That is, since the stiffness against tensile stress can be improved with fewer 0° layers than when the skin inner region 17 includes more 0° layers than other layers, it is possible to achieve light weight.

In the skin inner region 17 of the lower skin portion 11b, the number of ±45° layers having stiffness against torsional stress is greater than those of the other composite layers (0° layers and 90° layers). This makes it possible to maintain stiffness against torsional stress while improving stiffness against tensile stress.

[4. Anisotropic Composite Laminate Structure of Beam]

Figure 7:
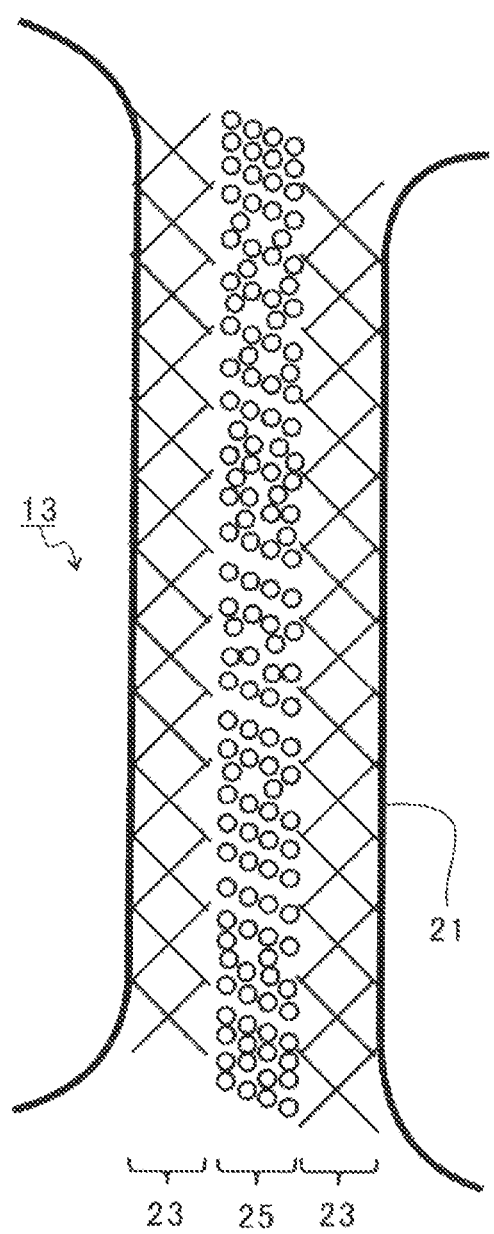
FIG. 7 is a schematic cross-sectional view illustrating an anisotropic composite laminate structure of a beam according to the embodiment.

FIG. 7 is a schematic cross-sectional view illustrating an anisotropic composite laminate structure of the beam 13 according to the present embodiment. As illustrated in FIG. 7, the beam 13 includes a web 21, which includes web outer regions 23 and a web inner region 25. The web outer regions 23 are located along both edges (on outer sides) of the web 21, and the web inner region 25 is located inside the web 21, between the web outer regions 23.

The web 21 of the present embodiment includes four types of composite layers containing reinforcing fibers oriented in the 0° direction, ±45° directions, and 90° direction. The 0° direction is, for example, the longitudinal direction of the main wing 5, the +45° direction is a direction inclined 45° toward one side of the 0° direction (upper side toward the wing tip) in the in-plane direction of the web 21, the −45° direction is a direction inclined 45° toward the other side of the 0° direction (lower side toward the wing tip) in the in-plane direction of the web 21, and the 90° direction is a direction orthogonal to the 0° direction in the in-plane direction of the web 21.

The web outer regions 23 each include more −45° layers than 0° layers, +45° layers, and 90° layers. The web inner region 25 includes more 0° layers and +45° layers than −45° layers and 90° layers.

Figures 8, 9:
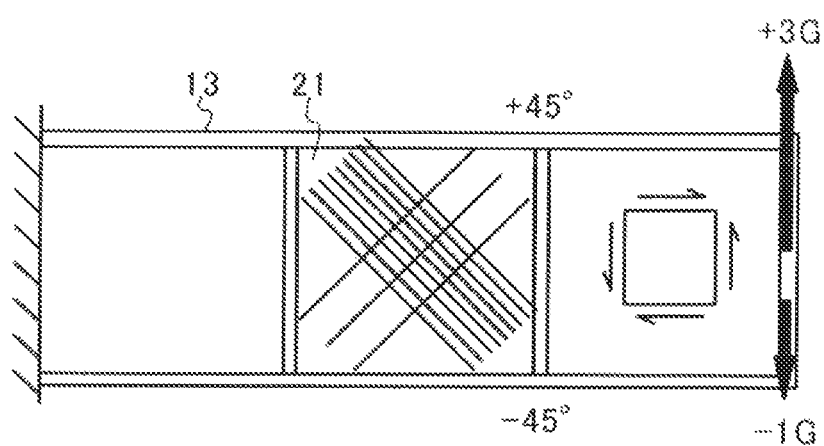
FIG. 8 is a diagram illustrating a detailed laminate configuration of a web according to the embodiment.
FIG. 9 is a schematic diagram for explaining a relation between a shear load acting on the web and a fiber orientation proportion according to the embodiment.

FIG. 8 is a diagram illustrating a detailed laminate configuration of the web 21 according to the present embodiment. As illustrated in FIG. 8, the web 21 of the present embodiment includes a total of 11 composite layers stacked in the thickness direction. Although all the composite layers are of equal thickness in the present embodiment, the configuration is not limited to this, and the composite layers may have different thicknesses. In FIG. 8, numbers ("ply number" in FIG. 8) are sequentially assigned to composite layers listed in order from the left side of the web 21 (left side in FIG. 7) to the right side of the web 21 (right side in FIG. 7). The smaller the ply number, the closer the layer is to the left side of the web 21, and the larger the ply number, the closer the layer is to the right side of the web 21.

The web 21 is divided into a plurality of regions (region 1, region 2, and region 3 here) in the thickness direction (stacking direction). Region 1 is a region including composite layers with ply numbers 9 to 11 and located on the right side of the web 21, to the right of regions 2 and 3. Region 2 is a region including composite layers with ply numbers 4 to 8 and located inside the web 21, between regions 1 and 3. Region 3 is a region including composite layers with ply numbers 1 to 3 and located on the left side of the web 21, to the left of regions 1 and 2. Region 1 and region 3 correspond to the web outer regions 23 illustrated in FIG. 7, and region 2 corresponds to the web inner region 25 illustrated in FIG. 7.

The composite layers in each region are stacked on the basis of stacking conditions 2 and 3 described above. As illustrated in FIG. 8, region 1, which includes three −45° layers with ply numbers 9 to 11 successive in the thickness direction, satisfies stacking condition 2. Also, region 1, where an angular difference between fiber orientations in two composite layers adjacent in the thickness direction does not exceed 45°, satisfies stacking condition 3.

Region 2 includes one 0° layer, one +45° layer, and one 90° layer that are successive in the thickness direction. That is, region 2, where no composite layers of equal fiber orientation are successively stacked in the thickness direction, satisfies stacking condition 2. Also, region 2, where an angular difference between fiber orientations in two composite layers adjacent in the thickness direction does not exceed 45°, satisfies stacking condition 3.

Region 3, which includes three −45° layers with ply numbers 1 to 3 successive in the thickness direction, satisfies stacking condition 2. Also, region 3, where an angular difference between fiber orientations in two composite layers adjacent in the thickness direction does not exceed 45°, satisfies stacking condition 3.

Regions 1 to 3 include six −45° layers, two +45° layers, two 0° layers, and one 90° layer in total. Since all the composite layers are of equal thickness, the anisotropic composite laminate structure includes the +45° layers and the −45° layers in different proportions. Accordingly, the anisotropic composite laminate structure of the web 21 according to the present embodiment does not satisfy stacking condition 4.

During flight of the aircraft 1, a vertical upward lift acts on the main wing 5, and a vertical upward load is applied to the web 21 of the beam 13. During landing of the aircraft 1, the own weight of the main wing 5 acts on the main wing 5 in a vertical downward direction, and a vertical downward load is applied to the web 21 of the beam 13.

FIG. 9 is a schematic diagram for explaining a relation between a shear load acting on the web 21 and a fiber orientation proportion according to the present embodiment. In FIG. 9, lines denoted as "+45°", running from the lower left to the upper right, are a representation of the number of +45° layers (three), and lines denoted as "−45°", running from the upper left to the lower right, are a representation of the number of −45° layers (nine).

During flight of the aircraft 1, a vertical upward load (see "+3 G" in FIG. 9) is applied to the web 21 by a lift. During landing of the aircraft 1, a vertical downward load (see "−1 G" in FIG. 9) is applied to the web 21 by its own weight.

A load applied to the web 21 produces stress and distortion inside the web 21. During flight of the aircraft 1, a lift causes a tensile stress to act on the web 21 in the +45° direction (or first direction crossing the longitudinal direction of the web 21). During landing of the aircraft 1, the own weight of the web 21 causes a compressive stress to act on the web 21 in the +45° direction.

During flight of the aircraft 1, a lift causes a compressive stress to act on the web 21 in the −45° direction (or second direction orthogonal to the first direction). During landing of the aircraft 1, the own weight of the web 21 causes a tensile stress to act on the web 21 in the −45° direction.

Generally, the vertical upward load (+3 G applied to the web 21 by the lift during flight of the aircraft 1 is greater than the vertical downward load (−1 G applied to the web 21 by the own weight of the web 21 during landing of the aircraft 1. In the present embodiment, the vertical upward load applied to the web 21 is three times greater than the vertical downward load applied to the web 21. Therefore, the compressive stress (second compressive stress) acting in the −45° direction (second direction) of the web 21 during flight of the aircraft 1 is greater than the compressive stress (first compressive stress) acting in the +45° direction (first direction) of the web 21 during landing of the aircraft 1.

In the web 21 of the present embodiment, therefore, the number of −45° layers having stiffness against the compressive stress in the −45° direction is greater than those of the other composite layers (0° layers, +45° layers, and 90° layers). This can improve stiffness of the web 21 against compressive stress produced during flight of the aircraft 1 and reduce buckling of the web 21.

In the web 21 according to the present embodiment, the proportion of the number of −45° layers to the number of +45° layers is determined in accordance with the proportion of the compressive stress in the −45° direction to the compressive stress in the +45° direction. In the present embodiment, where the proportion of the compressive stress in the −45° direction to the compressive stress in the +45° direction is 3:1, the proportion of the number of −45° layers to the number of +45° layers (fiber orientation proportion) is set to 3:1. Since buckling of the web 21 can be reduced with fewer +45° layers than when the web 21 includes −45° layers and +45° layers in equal proportion, it is possible to achieve light weight.

The web outer regions 23 of the web 21 each include more −45° layers than 0° layers, +45° layers, and 90° layers. In other words, a larger number of −45° layers having stiffness against compressive stress in the −45° direction are disposed on both sides (outer sides) of the web 21. When the web outer regions 23 include more −45° layers than other layers, the level of stiffness against the compressive stress in the −45° direction is higher than when the web inner region 25 includes more −45° layers. That is, since the stiffness against the compressive stress in the −45° direction can be improved with fewer −45° layers than when the web inner region 25 includes more −45° layers, it is possible to achieve light weight.

[5. Method of Designing Anisotropic Composite Laminate Structure]

Figure 10:
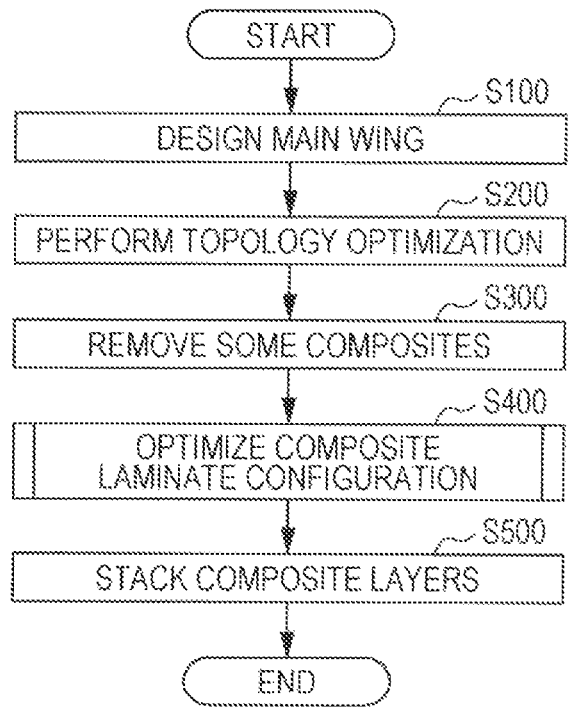
FIG. 10 is a flowchart illustrating a method of designing an anisotropic composite laminate structure of the aircraft according to the embodiment.

With reference to FIG. 10, a method of designing an anisotropic composite laminate structure of the aircraft 1 according to the present embodiment will be described. FIG. 10 is a flowchart illustrating a method of designing an anisotropic composite laminate structure of the aircraft 1 according to the present embodiment.

As illustrated in FIG. 10, the method of designing an anisotropic composite laminate structure of the aircraft 1 according to the present embodiment includes a step of designing the main wing 5 (S100), a topology optimization step (S200), a composite removing step (S300), a composite laminate configuration optimization step (S400), and a composite stacking step (S500). Each of these steps will now be described in detail.

(S100) Main Wing Designing Step

This step involves designing the configuration of the main wing 5, which is an airframe structure of the aircraft 1. Here, an example of designing the skin 11 and the beam 13 of the main wing 5 of the aircraft 1 will be described. The shapes, sizes, and materials of the skin 11 and the beam 13 are designed in accordance with characteristics of the main wing 5, such as the shape, strength, and functions, necessary to serve as the main wing 5 of the aircraft 1.

By a structural optimization simulation including the topology optimization (S200) and the composite laminate configuration optimization (S400), a skeleton model and a laminate configuration of the anisotropic composite laminate structure of the skin 11 and the beam 13 are designed. This design process may include the three steps (S200, S300, and S400) described below.

(S200) Topology Optimization Step

In the present step (S200), the optimal solution of the skeleton model of the anisotropic composite laminate structure is analyzed and designed by a topology optimization simulation to determine the basic layout of the anisotropic composite laminate structure.

Examples of the structural optimization used to design the shape of the anisotropic composite laminate structure include analysis techniques, such as dimensional optimization, shape optimization, and topology optimization. A basic idea of the topology optimization is "to find the most efficient distribution of materials in a set design space, under possible structural restrictions and conditions of loading and constraints during use of the anisotropic composite laminate structure". The topology optimization is an analysis technique used to find the optimal design plan by removing unnecessary materials under the conditions described above. The process of executing the topology optimization involves repeating the simulation and searching for efficient solutions.

In the present embodiment, the optimal skeleton model of the anisotropic composite laminate structure is designed by using an analysis tool for executing the topology optimization.

(S300) Composite Removing Step

In the present step (S300), a part of the anisotropic composite laminate structure is removed from the skeleton model designed in the step (S200) by taking into account the technical feasibility of the main wing 5 of the aircraft 1. Examples of the technical feasibility of the main wing 5 include (1) vehicular feasibility, (2) aerodynamic feasibility, and (3) manufacturing feasibility.

(S400) Composite Laminate Configuration Optimization Step

In the present step (S400), the laminate configuration (e.g., sheet thickness, fiber orientation) in each member of the anisotropic composite laminate structure is optimized by a composite laminate configuration optimization simulation, on the basis of the skeleton model of the anisotropic composite laminate structure designed in the steps described above (S200 and S300). For example, in the skeleton model of the anisotropic composite laminate structure, laminate configurations, such as the thickness and width of composite layers, the number of carbon fiber sheets (prepreg sheets) constituting each composite layer, and the orientation of carbon fibers, are determined. This analysis process involves using an analysis tool for executing the composite laminate configuration optimization. When a part of the anisotropic composite laminate structure is removed in the step described above (S300), the composite laminate configuration optimization is performed on the skeleton model obtained after the removal.

Figure 11:
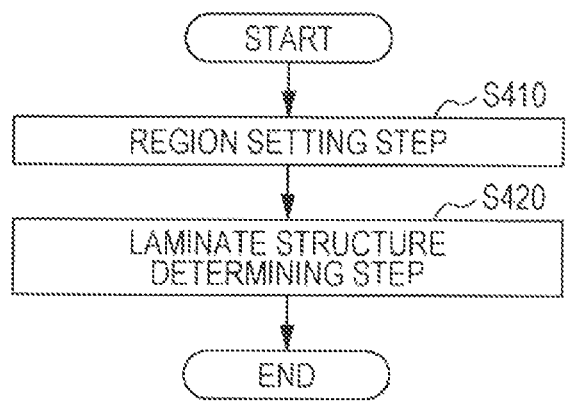
FIG. 11 is a flowchart of a composite laminate configuration optimization step according to the embodiment.

FIG. 11 is a flowchart illustrating the composite laminate configuration optimization step S400 according to the present embodiment. As illustrated in FIG. 11, the composite laminate configuration optimization step S400 includes a region setting step S410 and a laminate structure determining step S420.

(S410) Region Setting Step

The region setting step S410 divides the anisotropic composite laminate structure into a plurality of regions in the thickness direction. For example, the region setting step S410 divides the lower skin portion 11b into the skin outer region 15 and the skin inner region 17 as illustrated in FIG. 3 and FIG. 5, or divides the web 21 into the web outer regions 23 and the web inner region 25 as illustrated in FIG. 7. As illustrated in FIG. 4 and FIG. 6, the anisotropic composite laminate structure may be divided into a plurality of regions, each having a predetermined thickness (or including a predetermined number of layers), in the region setting step S410.

(S420) Laminate Structure Determining Step

The laminate structure determining step S420 determines, for each of the regions defined in the region setting step S410, at least the stacking sequence of the plurality of types of composite layers in accordance with the direction of stress acting on the predetermined member of the airframe structure of the aircraft 1. In the present embodiment, a fiber orientation proportion, as well as the stacking sequence of the plurality of types of composite layers, is determined for each of the regions defined in the region setting step S410, in accordance with the direction of stress acting on the predetermined member of the airframe structure of the aircraft 1. In the present embodiment, the fiber orientation proportion and the stacking sequence of composite layers are determined as illustrated in FIG. 3 to FIG. 8, in accordance with the direction and magnitude of load (stress) acting on the predetermined member of the airframe structure and stacking conditions 1 to 4 described above.

In the steps described above (S200, S300, and S400), the skeleton model and the laminate configuration of the anisotropic composite laminate structure are determined.

(S500) Composite Stacking Step

The present step (S500) involves stacking a plurality of prepreg sheets on the basis of the laminate configuration designed as described above. The thickness and the width of the anisotropic composite laminate structure in each of the members, the skin 11 and the beam 13, of the main wing 5 are thus adjusted. For example, the prepreg sheets may be stacked by an automatic stacking technique using a robot.

The method of designing an anisotropic composite laminate structure according to the present embodiment includes the region setting step (S410) and the laminate structure determining step (S420) as described above. Thus, in accordance with the direction of stress acting on each member of the airframe structure, an appropriate fiber orientation proportion and an appropriate stacking sequence that utilize the properties of the anisotropic material, can be determined for each of regions (such as the outer region and the inner region) into which the anisotropic composite laminate structure is divided in the thickness direction. This makes it possible to reduce the number of composite layers in the anisotropic composite laminate structure and achieve light weight. That is, at least one of the aircraft 1 and/or the anisotropic composite laminate structure for the aircraft 1 may be formed based on the designing of the anisotropic composite laminate structure according to the present embodiment that includes the region setting step (S410) and the laminate structure determining step (S420).

Although preferred embodiments of the disclosure have been described with reference to the accompanying drawings, the disclosure is not limited to the embodiments described above. Any person skilled in the art can conceive various changes and modifications within the scope of the appended claims. It is to be understood that such changes and modifications are also included in the technical scope of the disclosure.

The embodiments of the disclosure make it possible to optimize the stacking sequence in the anisotropic composite laminate structure while making use of the properties of the anisotropic material.

The invention claimed is:

1. A method of designing an anisotropic composite laminate structure to constitute a predetermined member of an airframe structure of an aircraft, the anisotropic composite laminate structure including a plurality of types of composite layers, each of the plurality of types of composite layers containing reinforcing fibers with different fiber orientations and defined by a unidirectional fiber orientation of the different fiber orientation, the method comprising:

dividing the anisotropic composite laminate structure in the predetermined member into a plurality of regions in a thickness direction where the composite layers are stacked, with each region comprising a plurality of region specific associated composite layers; and determining, for each of the regions, at least a stacking sequence of the plurality of types of composite layers in accordance with a direction of stress acting on the predetermined member, and such that, over an entirety of the thickness direction, each pair of adjacent regions has a different stacking sequence in the region specific associated composite layers.

2. The method according to claim 1, wherein the predetermined member is a skin on a lower side of a wing of the aircraft;

the regions include an outer region and an inner region of the skin;

a stress acting on the skin includes a tensile stress in a longitudinal direction of the wing and a torsional stress in a direction of twisting the wing; and in the determining, the outer region of the skin is defined so as to include more composite layers having stiffness against the torsional stress than other composite layers of the plurality of types of composite layers, and the inner region of the skin is defined so as to include more composite layers having stiffness against the tensile stress than other composite layers of the plurality of types of composite layers.

3. The method according to claim 1, wherein the predetermined member is a skin on a lower side of a wing of the aircraft, the regions include an outer region and an inner region of the skin;

a stress acting on the skin includes a tensile stress in a longitudinal direction of the wing and a torsional stress in a direction of twisting the wing; and in the determining, the outer region of the skin is defined so as to include more composite layers having stiffness against the tensile stress than other composite layers of the plurality of types of composite layers, and the inner region of the skin is defined so as to include more composite layers having stiffness against the torsional stress than other composite layers of the plurality of types of composite layers.

4. The method according to claim 1, wherein the predetermined member is a web of a beam of a wing of the aircraft;

a stress acting on the web includes a first compressive stress acting in a first direction crossing a longitudinal direction of the web and a second compressive stress acting in a second direction orthogonal to the first direction;

the second compressive stress is greater than the first compressive stress; and in the determining, the web is defined as a member that includes more composite layers having stiffness against the second compressive stress than other composite layers of the plurality of types of composite layers.

5. The method according to claim 4, wherein in the determining, a fiber orientation proportion in accordance with a proportion of the second compressive stress to the first compressive stress is determined, the fiber orientation proportion being a proportion of the number of composite layers having stiffness against the second compressive stress to the number of composite layers having stiffness against the first compressive stress.

6. The method according to claim 1, wherein in the determining, the stacking sequence of the plurality of types of composite layers is determined such that an angular difference between fiber orientations in two composite layers adjacent in the thickness direction does not exceed 45°.

7. The method according to claim 2, wherein in the determining, the stacking sequence of the plurality of types of composite layers is determined such that an angular difference between fiber orientations in two composite layers adjacent in the thickness direction does not exceed 45°.

8. The method according to claim 3, wherein in the determining, the stacking sequence of the plurality of types of composite layers is determined such that an angular difference between fiber orientations in two composite layers adjacent in the thickness direction does not exceed 45°.

9. The method according to claim 4, wherein in the determining, the stacking sequence of the plurality of types of composite layers is determined such that an angular difference between fiber orientations in two composite layers adjacent in the thickness direction does not exceed 45°.

10. The method according to claim 5, wherein in the determining, the stacking sequence of the plurality of types of composite layers is determined such that an angular difference between fiber orientations in two composite layers adjacent in the thickness direction does not exceed 45°.

11. The method according to claim 1, wherein the regions include three regions represented by an inner core region, and two outer regions, with the outer regions having stacking sequences that are different than the adjacent, inner core region.

12. The method according to claim 11, wherein the outer regions have a common stacking sequence as to provide a symmetric arrangement to opposite sides of the inner core region.

13. The method according to claim 1, wherein the regions include at least four regions with each of the four regions having a different stacking sequence.

14. The method according to claim 1, wherein the predetermined member is a skin on a lower side of a wing of the aircraft, wherein the regions include at least four regions with a first set of the regions defining an outer skin region and a second set of the four regions defining an inner skin region;

wherein a stress acting on the skin includes a tensile stress in a longitudinal direction of the wing and a torsional stress in a direction of twisting the wing; and in the determining, the outer skin region is defined so as to include more composite layers having stiffness against the tensile stress than other composite layers of the plurality of types of composite layers, and the inner skin region is defined so as to include more composite layers having stiffness against the torsional stress than other composite layers of the plurality of types of composite layers.

15. The method according to claim 14, wherein each of the four regions has a different stacking sequence.

16. The method according to claim 1, wherein the predetermined member is a skin on a lower side of a wing of the aircraft, wherein the regions include four regions with a first set of the regions defining an outer skin region of the skin and a second set of the four regions defining an inner skin region of the skin;

a stress acting on the skin includes a tensile stress in a longitudinal direction of the wing and a torsional stress in a direction of twisting the wing; and in the determining, the outer skin region is defined so as to include more composite layers having stiffness against the tensile stress than other composite layers of the plurality of types of composite layers, and the inner skin region is defined so as to include more composite layers having stiffness against the torsional stress than other composite layers of the plurality of types of composite layers.

17. The method according to claim 16, wherein each of the four regions has a different stacking sequence.

18. The method according to claim 1, wherein the composite layers of different fiber orientations are in equal proportions relative to the total thickness of all of said regions.

19. The method according to claim 18, wherein there is an even number of regions to each side of a center location in the entirety of the thickness direction, with the even number of regions having different proportions in fiber orientations such that, relative to the center location, there is a non-symmetrical fiber orientation arrangement in the composite laminate.

20. The method according to claim 1, wherein the determining includes determining, for each of the regions, fiber orientation proportions of the composite layers of different fiber orientations, each of the fiber orientation proportions represents (i) a proportion of a total thickness of the composite layers of each of the different fiber orientations with respect to a total thickness of the composite layers of the different fiber orientations in each of the regions, (ii) a proportion of a number of the composite layers of each of the different fiber orientations with respect to a number of the composite layers of the different fiber orientations in each of the regions, when all the composite layers of the different fiber orientations have equal thickness, (iii) a proportion of a total thickness of the composite layers of one of the different fiber orientations with respect to a total thickness of the composite layers of another one of the different fiber orientations in each of the regions, and (iv) a proportion of a number of the composite layers of one of the different fiber orientations with respect to a number of the composite layers of another of the different fiber orientations in each of the regions, when all the composite layers of the different fiber orientations have equal thickness.

21. The method according to claim 1, wherein each region has a same number of composite layers.

* * * * *